United States Patent [19]

Asghar et al.

[11] Patent Number: 5,745,648

[45] Date of Patent: Apr. 28, 1998

[54] APPARATUS AND METHOD FOR ANALYZING SPEECH SIGNALS TO DETERMINE PARAMETERS EXPRESSIVE OF CHARACTERISTICS OF THE SPEECH SIGNALS

[75] Inventors: Safdar M. Asghar; Mark A. Ireton, both of Austin, Tex.

[73] Assignee: Advanced Micro Devices, Inc., Sunnyvale, Calif.

[21] Appl. No.: 851,411

[22] Filed: May 5, 1997

Related U.S. Application Data

[63] Continuation of Ser. No. 318,379, Oct. 5, 1994, abandoned.
[51] Int. Cl.$^6$ ........................................................ G10L 3/02
[52] U.S. Cl. ................................... 395/2.13; 395/2.28
[58] Field of Search ........................... 395/2.09, 2.13, 395/2.28, 2.3, 2.15, 2.75

[56] References Cited

U.S. PATENT DOCUMENTS

| | | | |
|---|---|---|---|
| 4,393,272 | 7/1983 | Itakura et al. | 395/2.78 |
| 4,975,956 | 12/1990 | Liu et al. | 381/36 |
| 5,012,518 | 4/1991 | Liu et al. | 381/42 |
| 5,027,404 | 6/1991 | Taguchi | 395/2.3 |
| 5,305,421 | 4/1994 | Li | 395/2.28 |
| 5,414,796 | 5/1995 | Jacobs et al. | 395/2.3 |
| 5,448,680 | 9/1995 | Kang et al. | 395/2.34 |

OTHER PUBLICATIONS

COMSIG 88. Southern African Conference on Communications and Signal Processings; Smith et al, "Line–spectrum pairs –a review", pp. 7–11, Jun. 1988.

ICASSP * *: 1988 International on Acoustics, Speech, and Signal processing; Paliwal, "A Study of Line Spectrum pair frequencies for speech recognition", pp. 485–488, Apr. 1988.

*Primary Examiner*—Allen R. MacDonald
*Assistant Examiner*—Richemond Dorvil
*Attorney, Agent, or Firm*—Foley & Lardner

[57] ABSTRACT

An apparatus and method for locating a plurality of roots of a line spectrum pair expression on a unit circle. The method comprises the steps of: (1) receiving an initial value for locating a first site on the unit circle; (2) receiving a step value for defining an arc-distance on the unit circle; (3) generating intervals on the unit circle, each having a lower limit and an upper limit; the lower limit of the initial interval is the initial value and the upper limit of the initial interval is displaced on the unit circle from the initial value by the arc-distance; each succeeding interval has its lower limit coincident with the upper limit of the next preceding interval and has its upper limit displaced on the unit circle from its lower limit by the arc-distance; (4) evaluating the expression for at least the upper limit and the lower limit of each respective interval; (5) recognizing a root of the expression when the expression changes sign within an interval; (6) designating each such interval as a solution interval; and (7) generating the lower and upper limits of each solution interval to identify where the root is located. The apparatus comprises a waveform generator which receives the initial value and the step value and defines the arc-distance, and generates the intervals; a zero detector for recognizing roots of the expression when the expression changes sign.

20 Claims, 9 Drawing Sheets

APPARATUS AND METHOD FOR ANALYZING SPEECH SIGNALS TO DETERMINE PARAMETERS EXPRESSIVE OF CHARACTERISTICS OF THE SPEECH SIGNALS

This is a continuation of application Ser. No. 08/318,379 filed Oct. 5, 1994 abandoned.

BACKGROUND OF THE INVENTION

Numerous methods have been developed for speech analysis and speech synthesis. The most successful methods thus far are concerned with speech spectrum conservation rather than speech waveform, such speech spectrum conservation is sufficient to insure adequate speech quality and intelligibility for many purposes. Generally, in a speech analysis and synthesis method, certain predetermined parameters corresponding to particular speech spectra are extracted at an analyzer end and, at the receiver end, the speech waveform is synthesized from those predetermined parameters. The difference among the various methods is the difference in the predetermined parameters.

Most research has been concentrated on finding predetermined parameters which express speech characteristics efficiently. One method, linear predictive coding (LPC), has been successful but has been found not as efficient as desired because of quantization characteristics associated with linear predictive coding.

Another idea for speech synthesis and analysis is based on an assumption that a speech signal can be approximately represented as an output signal from an all-pole filter. The PARCOR (PARtial autoCORrelation) lattice filter is employed to implement this assumption. The PARCOR speech analysis and synthesis method has been found to be efficient for narrow band speech coding. However, the PARCOR method has limitations with regard to data compression. In particular, PARCOR-synthesized speech quality rapidly deteriorates at bit rates lower than 4.8 kilobytes per second. There are two main reasons for this: (1) in parameter quantization, between 4 and 8 bits are required for the PARCOR coefficients, and (2) the spectral distortion due to parameter interpolation increases rapidly as the parameter refreshing period is lengthened.

Another approach to speech synthesis and analysis is the line spectrum pair (LSP) method. The line spectrum pair method also employs an all-pole model of speech, and employs line spectrum pair parameters which are interpreted as one of the linear predictive coding parameters in the frequency domain.

Line spectrum pairs (LSP's) are a transformed representation of the canonical linear predictive coding (LPC) filter coefficients, which possess some useful characteristics. The LSP representation gives an accurate approximation to the short term spectrum using relatively few bits. The LSP representation also has the useful property of error localization. For example, an error in a particular coefficient will only introduce distortion in the frequency spectrum in frequencies close to the frequency represented by the coefficient. These parameters are also useful for vector quantization where good results can be obtained using a simple mean squared error measure on the coefficient vectors.

Any of the above-described methods (LPC, PARCOR, LSP) have heretofore been implemented in inefficient, cumbersome, memory-expensive ways. For example, LSP requires either a cosine computation algorithm or a large look-up table in which to store cosine values. The cosine computation is complex, and a look-up table requires a large amount of memory, especially if highly accurate results are required.

There is, therefore, a need for a method and apparatus for solving line spectrum pair expressions which is efficient in its storage requirements and efficient in effecting root determination.

SUMMARY OF THE INVENTION

The present invention is an apparatus and method for locating a plurality of roots of a line spectrum pair expression on a unit circle. In its preferred embodiment, the apparatus comprises a waveform generating unit which has a first input for receiving a representation of an initial value for locating a first site on the unit circle. The waveform generating unit also has a second input for receiving a representation of a step value for defining an arc-distance on the unit circle. The waveform generating unit generates a plurality of intervals on the unit circle, each interval having a lower limit and an upper limit. The plurality of intervals includes an initial interval and a plurality of succeeding intervals. The lower limit of the initial interval is the initial value, and the upper limit of the initial interval is displaced on the unit circle from the initial value by the arc-distance. Each respective succeeding interval has its respective lower limit coincident with the upper limit of the next-preceding interval and has its respective upper limit displaced on the unit circle from its respective lower limit by the arc-distance. The apparatus further includes a polynomial zero detecting unit coupled with the waveform generating unit for receiving a plurality of intervals and evaluating a line spectrum pair expression for at least the upper limit and the lower limit of each respective interval. The polynomial zero detecting unit recognizes the presence of a respective root of the line spectrum pair expression when the evaluated expression changes sign within a particular interval. The polynomial zero detecting unit designates each such particular interval as a solution interval and generates the lower limit and upper limit of each such solution interval.

For increased accuracy beyond the initial accuracy provided by the predetermined intervals, the apparatus may include a half-distance generating unit coupled with the waveform generating unit for generating a half-arc-distance which is substantially ½ the arc-distance. Further included in this improved accuracy apparatus is an angle bisecting unit coupled with the half-distance generating unit and coupled with the polynomial zero detecting unit which receives the solution intervals from the polynomial zero detecting unit and receives a half-arc-distance from the half-distance generating unit. The angle bisecting unit performs a bisecting operation defining a lower refined solution interval and an upper refined solution interval. The lower refined solution interval has a lower refined lower limit at the lower limit of the solution interval and has a lower refined upper limit spaced on the unit circle from the lower refined lower limit by the half-arc-distance. The upper refined solution interval has an upper refined upper limit at the upper limit of the solution interval and has an upper refined lower limit displaced on the unit circle from the upper refined upper limit by the half-arc-distance. The improved accuracy apparatus further includes a selection unit coupled with the angle bisecting unit and with the polynomial zero detecting unit. The selection unit generates a lower limit output and an upper limit output appropriately to indicate whether the respective root is located in the lower refined solution interval or in the upper refined solution interval. The apparatus may be employed to further refine accuracy of the location by employing the half-distance generating unit and the angle bisecting unit cooperatively to successfully perform the bisecting operation to effectively bisect each solution interval into a successive upper refined solution interval and successive lower refined solution interval, the respective root being located within one of the successive upper refined solution interval and the successive lower refined solution interval. The successive bisecting operation is iteratively effected until a predetermined desired accuracy of the arc-distance is included in a successive refined solution interval.

Preferably, the initial value is expressed as a sinusoidal value of an angular displacement on the unit circle and the step value is expressed as a sinusoidal value of a step-angular displacement on the unit circle.

The invention further includes a method for locating a plurality of roots of a line spectrum pair expression on a unit circle which comprises the steps of: (1) receiving a respective representation of an initial value for locating a first site on the unit circle; (2) receiving a representation of a step value for defining an arc-distance on the unit circle; (3) generating a plurality of intervals on the unit circle, each interval having a lower limit and an upper limit, the intervals including an initial interval and a plurality of succeeding intervals (The lower limit of the initial interval is the initial value and the upper limit of the initial interval is displaced on the unit circle from the initial value by an arc-distance. Each respective succeeding interval has its respective lower limit coincident with the upper limit of the next preceding interval, and each respective succeeding interval has its respective upper limit displaced on the unit circle from its respective lower limit by the arc-distance); (4) evaluating the line spectrum pair expression for at least the upper limit and the lower limit of each respective interval; (5) recognizing the presence of a respective root of the line spectrum pair expression when the line spectrum pair expression changes sign within a particular interval; (6) designating each such particular interval as a solution interval; and (7) generating the lower limit and the upper limit of each such solution interval to identify the arc-distance within which the particular root is located.

It is therefore an object of the present invention to provide an apparatus and method of locating a plurality of roots of a line spectrum pair expression which employs sinusoidal values in its calculations to determine the roots without deriving the roots from an angular representation associated with the unit circle.

It is a further object of the present invention to provide an apparatus and method of locating a plurality of roots of a line spectrum pair expression on a unit circle which is efficient in its use of memory storage space and addressal of that memory storage space in determining the roots.

It is a still further object of the present invention to provide an apparatus and method for locating a plurality of roots of a line spectrum pair expression on the unit circle which may provide increased accuracy of location of a root by successively bisecting an interval within which a root is determined to be located.

Further objects and features of the present invention will be apparent from the following specification and claims when considered in connection with the accompanying drawings illustrating the preferred embodiment of the invention.

DETAILED DESCRIPTION OF THE INVENTION

Before referring to the figures, a brief theoretical background discussion will be provided.

It is desirable in modeling vocal tract action to amplify and suppress certain spectral ranges (modifications of spectrum of "signals" from vocal cords). A basic known canonical feedback digital filter transfer function appropriate for modeling a vocal tract may be expressed as:

$$V(z) = \frac{1}{\sum_{i=0}^{n} a_i \cdot z^{-1}} \; ; a_o = 1 \tag{1}$$

In models of vocal tract action, there is a need to transmit values of $a_i$ to a decoder from an encoder, so one must be able to quantize the values of $a_i$. The most preferable quantization technique is the technique that uses the fewest bits in order to most efficiently employ the apparatus used for such transmission.

Generally, the coefficient values $a_i$ have some undesirable qualities, such as: some coefficients $a_i$ are more sensitive than others; sometimes an error in one coefficient $a_i$ affects the entire spectrum sought to be represented.

It has been found that it is better to transform the coefficients $a_i$ to a quantized transformation value which is, necessarily, capable of inversion to recover the original value from which the quantized value is transformed. There are many transformations; line spectrum pair (LSP) is one transformation.

The apparatus and method of the present invention are appropriate for determining roots of the expressions which result from the LSP transformation.

As is well known in the art of speech analysis and speech synthesis, a linear predictive coding (LPC) analysis results in an all-pole filter described by a transfer function involving parameters $a_i$ known as LPC coefficients. It is also well known that LPC coefficients are inappropriate for quantization primarily because of their wide dynamic range and variation of different LPC coefficients in their sensitivity to errors.

Figure 9:
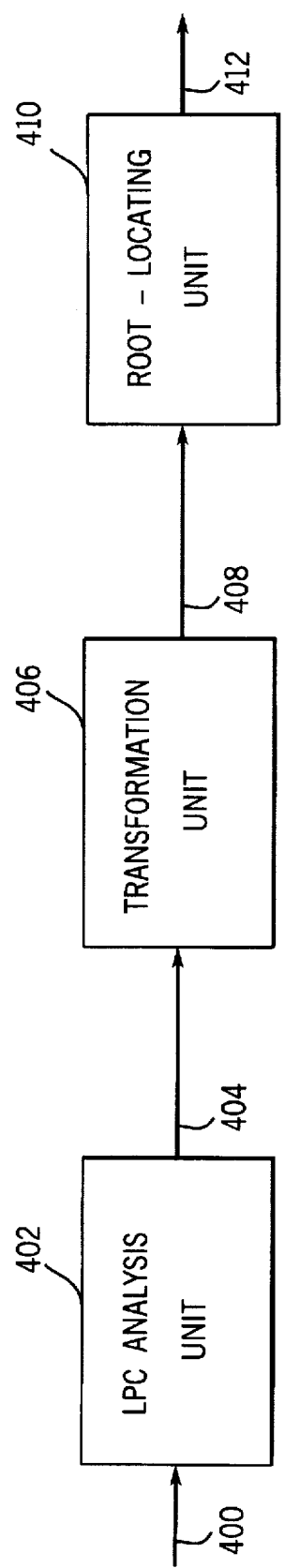
FIG. 9 is a block diagram showing an apparatus for analyzing speech signals.

In summary, an apparatus for analyzing speech signals as described above is shown in FIG. 9. An LPC analysis of speech signals 400 is performed by an LPC analysis unit 402 parameters or coefficients 404. A transformation unit 406 transforms LPC coefficients 404 to a corresponding line spectrum pair (LSP) expression or polynomial 408. Roots 412 of LSP expression 408 are then determined by a root-locating unit 410. As stated above, LPC analysis unit 402 and transformation unit 406 are well-known in the art. Thus, this detailed description focusses upon the details of root-locating unit 410.

Line spectrum pair parameters may be derived from a consideration of two extreme artificial boundary conditions applied to LPC coefficients. The resulting LSP parameters can be interpreted as the resonant frequencies of the vocal tract under the two extreme artificial boundary conditions at the glottis. The two polynomials which involve the line spectrum pair parameters possess some interesting properties summarized as follows:

(1) all roots of the two polynomials lie on the unit circle in the complex plane; and (2) the roots of the two polynomials alternate each other on the unit circle so that the following relationship is always satisfied:

$$0 = \omega_o < \omega_1 < \omega_2 < \ldots \omega_{p-1} < \omega_p < \omega_{p+1} \quad (2)$$

Even ω's are derived from one polynomial, and odd ω's are derived from the other polynomial. This is referred to as the ordering property of LSP parameters.

Further, all roots of each of the polynomials (each of the polynomials is a fifth order polynomial) lie on the unit circle in the Z-plane (the complex plane) so that when the model (or the system represented by the model) is in equilibrium, the roots lie on the unit circle. Outside the unit circle the signal amplitude increases, and inside the unit circle the signal damps.

Preferably, each polynomial is expressed in terms of cos ω. The inventors have found that intervals of $$\frac{\pi}{64} \left( \text{i.e., } \omega = \frac{\pi}{64} \right)$$

will not miss any roots. Further, bisecting the $$\frac{\pi}{64}$$

angle twice to make $$\omega = \frac{\pi}{256}$$

gives sufficient accuracy for purposes of decoding voice data.

A useful method for more accurately determining the roots, at least approximately, of the LSP polynomials is by approximating the cosine of a bisecting angle within an interval given the cosine of the boundary angles, and determining in which half-angle interval the root lies. Thus, one can double the precision by which one determines where on the unit circle a root lies simply by halving an interval and determining within which newly-defined half-interval the root lies.

It is known that $$\cos (A+B) = 2 \cos A \cos B - \cos (A-B) \quad (3)$$

If we let $$B = \frac{\pi}{64}$$

(the incremental value), we can be assured that the intervals are established appropriately that no roots will be missed on the unit circle. As a practical matter, however, since the value $$B = \frac{\pi}{64}$$

is close to zero, the value of $$\cos \frac{\pi}{64}$$

is too close to 1 to be efficiently handled by digitally configured logical elements. That is, the value of $$\cos \frac{\pi}{64}$$

involves too many leading nines which must be carried and stored and manipulated throughout the various calculations required. Such inefficiency may be avoided by using the value $$\left( 1 - \cos \frac{\pi}{64} \right)$$

to ease storage and processing requirements.

Thus, Equation (3) may be rewritten as:

$$\cos (A+B) = 2 \cos A - 2 \cos A (1 - \cos B) - \cos (A-B) \quad (4)$$

Equation (4) is the equation used in the preferred embodiment of the present invention to "step around" the unit circle to locate the five roots of an LSP polynomial expression. However, for ease in understanding the invention, the remaining discussions explaining the invention will be based upon the expression in Equation (3).

Figure 1A:
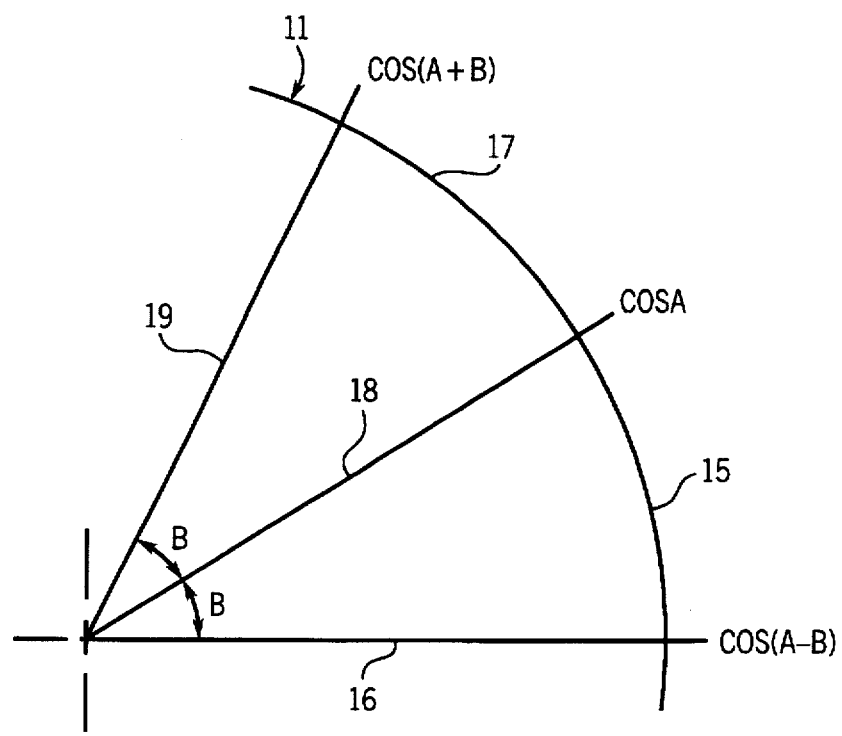
FIG. 1a is a schematic drawing of the angles and values employed in "stepping around" the unit circle to locate roots of a line spectrum pair expression.

FIG. 1a is a schematic drawing of the angles and values employed in "stepping around" the unit circle to locate roots of a line spectrum pair expression.

In FIG. 1a, ω or the step angle used to "step around" a unit circle 11 to determine location of roots of a line spectrum pair expression is illustrated as being equal to B, so that the radii 16, 18 delineate a sector 15 of unit circle 11, and radii 18, 19 delineate a sector 17 of unit circle 11. We know that:

$$\cos (A+B) = 2 \cos B \cos A - \cos (A-B) \quad (5)$$

Thus, sector 15 has an upper limit equal to the value cos A and has a lower limit equal to the value cos(A−B). Further, sector 17 has an upper limit equal to the value cos (A+B) and has a lower limit equal to the value cos A.

If we let $A = \left( A - \frac{B}{2} \right)$, and let $B = \left( \frac{B}{2} \right)$, then:

$$\cos \left[ \left( A - \frac{B}{2} \right) + \frac{B}{2} \right] = \quad (6)$$

$$2 \cos \frac{B}{2} \cos \left( A - \frac{B}{2} \right) - \cos \left[ \left( A - \frac{B}{2} \right) - \frac{B}{2} \right]$$

Therefore:

$$\cos A = 2\cos\frac{B}{2}\cos\left(A - \frac{B}{2}\right) - \cos(A - B) \quad (7)$$

Solving for $\cos\left(A - \frac{B}{2}\right)$:

$$\cos\left(A - \frac{B}{2}\right) = \frac{\cos A + \cos(A - B)}{2\cos\left(\frac{B}{2}\right)} \quad (8)$$

Given stored values of predetermined values of the expression $$\left(\frac{1}{2\cos\frac{B}{2^n}}\right),$$

the bisection of step angle B can be easily performed using a computer apparatus. Typically, in the preferred embodiment of the present invention, only a very small number of stored values of the expression $$\left(\frac{1}{2\cos\frac{B}{2^n}}\right)$$

will be required. By such successive bisection, the technique for determining a root of an LSP expression may be very efficiently performed to a desired accuracy.

For the purposes of a coarse search for roots, the value of $\cos B$ is a constant stored in a computer memory. Recalling Equation (5):

$$\cos(A+B) = 2\cos B \cos A - \cos(A - B) \quad (5)$$

if one lets $$A = \frac{B}{2} \text{ and } B = \frac{B}{2},$$

Equation (5) may be written as:

$$\cos\left(\frac{B}{2} + \frac{B}{2}\right) = 2\cos\frac{B}{2}\cos\frac{B}{2} - \cos\left(\frac{B}{2} - \frac{B}{2}\right) \quad (9)$$

which reduces to:

$$\cos B = 2\cos\frac{B}{2}\cos\frac{B}{2} - 1 \quad (10)$$

Solving for $\cos\frac{B}{2}$:

$$\cos\frac{B}{2} = \sqrt{\frac{\cos B + 1}{2}} \quad (11)$$

More generally stated for values of n other than n=1:

$$\cos\frac{B}{2^n} = \sqrt{\frac{\cos\frac{B}{2^{n-1}} + 1}{2}} \quad (12)$$

Hence, the cosines of the successively bisected step angles $$B, \frac{B}{2}, \frac{B}{2^2}, \ldots \frac{B}{2^n}$$

may be calculated in sequence and stored as required.

One problem which has arisen is that the difference equation expressed as Equation (5) is difficult to calculate accurately for step angles B when using finite precision arithmetic, a common problem with computers. This difficulty arises from the loss of precision induced by leading nines in the value of cos B. For example, cos 1° equals 0.999847.

It is often necessary to work with such small angle or phase increments in determining roots of line spectrum pair expressions to a sufficiently accurate certainty. One solution is to use the expression (1−cos B) in the computation instead of the value of cos B.

Thus, if one substitutes cos B=1−(1−cos B) in Equation (5):

$$\cos(A+B) = 2\cos A(1-(1-\cos B)) - \cos(A-B) \quad (13)$$

which expands to:

$$\cos(A+B) = 2\cos A - 2\cos A(1-\cos B) - \cos(A-B) \quad (14)$$

An advantage of this representation is that (1−cos B) can be scaled so that all of the digits are significant. In terms of finite precision arithmetic implementation, the product (cos A(1−cos B)) can be determined accurately and scaled before summing with the other components. Further, this formulation is ideal for application at locations in which the precision of the ALU (arithmetic logic unit) employed in a computer is greater than that of the multiplier. As a result, the values can be determined with minimal loss of precision.

By similar logic, Equation (8) requires the use of values of $$\cos\left(\frac{B}{2}\right),$$

and further bisection will require use of the values $$\cos\left(\frac{B}{2^n}\right).$$

It is useful to rewrite Equation (8) as:

$$\cos\left(A - \frac{B}{2}\right) = \frac{\cos A + \cos(A - B)}{2} \cdot \frac{1}{\cos\left(\frac{B}{2}\right)} \quad (15)$$

If we let A=A+B, Equation (15) becomes:

$$\cos\left(A + \frac{B}{2}\right) = \frac{\cos A + \cos(A + B)}{2} \cdot \frac{1}{\cos\left(\frac{B}{2}\right)} \quad (16)$$

Recall the relationship (Taylor series):

$$(1-x)^{-1} = 1 + x + x^2 + x^3 + \ldots ; |x| < 1 \quad (17)$$

Therefore, if we let (1−x) equal $$\cos\left(\frac{B}{2}\right),$$

Equation (17) may be used to approximate $(1-x)^{-1} = 1+x$.

Thus, if:

$$(1 - x) = \cos\left(\frac{B}{2}\right) \quad (18)$$

then:

$$1 + x = 1 + \left(1 - \cos\frac{B}{2}\right) \quad (19)$$

and note:

$$\frac{1}{\cos\left(\frac{B}{2}\right)} = (1-x)^{-1} \quad (20)$$

Therefore:

$$\frac{1}{\cos\left(\frac{B}{2}\right)} \approx 1 + x = 1 + \left(1 - \cos\frac{B}{2}\right) \quad (21)$$

Thus, an approximation to $$\left(\frac{1}{\cos\left(\frac{B}{2}\right)}\right)$$

and, thence, to $$\left(\frac{1}{\cos\left(\frac{B}{2^n}\right)}\right),$$

is provided by the stored values of $$1 - \cos\frac{B}{2^n}.$$

Since x in this situation is very small by definition of its requirement for this process, then the approximation by the Taylor series is accurate, especially when finite precision arithmetic is being used.

Thus, substituting Equation (21) into Equation (16) yields:

$$\cos\left(A + \frac{B}{2}\right) = \frac{\cos A + \cos(A+B)}{2} \cdot \left(1 + \left(1 - \cos\frac{B}{2}\right)\right) \quad (22)$$

As previously mentioned, for sufficiently small angles (100° is sufficiently small), the inventors have determined that the expression of Equation (21) is sufficiently accurate.

Thus, given (1–cos B), one can perform all of the operations required to determine the cosines of the angles of a line spectrum pair calculation using linear search bisection. Such an approach should be compatible with finite precision arithmetic generally used in computers. Thus, given Equation (5):

$$\cos(A+B) = 2\cos B \cos A - \cos(A-B) \quad (5)$$

let cos X=1–(1–cos X); so that Equation (5) may be rewritten as:

$$1 - (1 - \cos(A + B)) = 2[(1 - (1 - \cos A))(1 - (1 - \cos B))] - \quad (23)$$

$$[1 - (1 - \cos(A - B))]$$

Thus:

$$1 - (1 - \cos(A + B)) = 2\,[1 - (1 - \cos B) - (1 - \cos A) + \quad (24)$$

$$(1 - \cos A)(1 - \cos B)] - 1 + (1 - \cos(A + B))$$

Further reducing:

$$1 - (1 - \cos(A + B)) = 2 + 2\,[-(1 - \cos B) - (1 - \cos A) + \quad (25)$$

$$(1 - \cos A)(1 - \cos B)] - 1 + (1 - \cos(A - B))$$

Thus:

$$-(1 - \cos(A + B)) = 2\,[-(1 - \cos B) - (1 - \cos A) + \quad (26)$$

$$(1 - \cos A)(1 - \cos B)] + 1(1 - \cos(A - B))$$

Thus:

Thus:

$$(1 - \cos(A + B)) = -2\,[-1(1 - \cos B) - (1 - \cos A) + \quad (27)$$

$$(1 - \cos A)(1 - \cos B)] - 1(1 - \cos(A - B))$$

$$(1 - \cos(A + B)) = 2\,[(1 - \cos A) - (1 - \cos A)(1 - \cos B) + \quad (28)$$

$$(1 - \cos B)] - (1 - \cos(A - B))$$

Equation (28) enables one to configure a waveform generator accurately for small angle increments for implementation of the present invention.

Figure 1B:
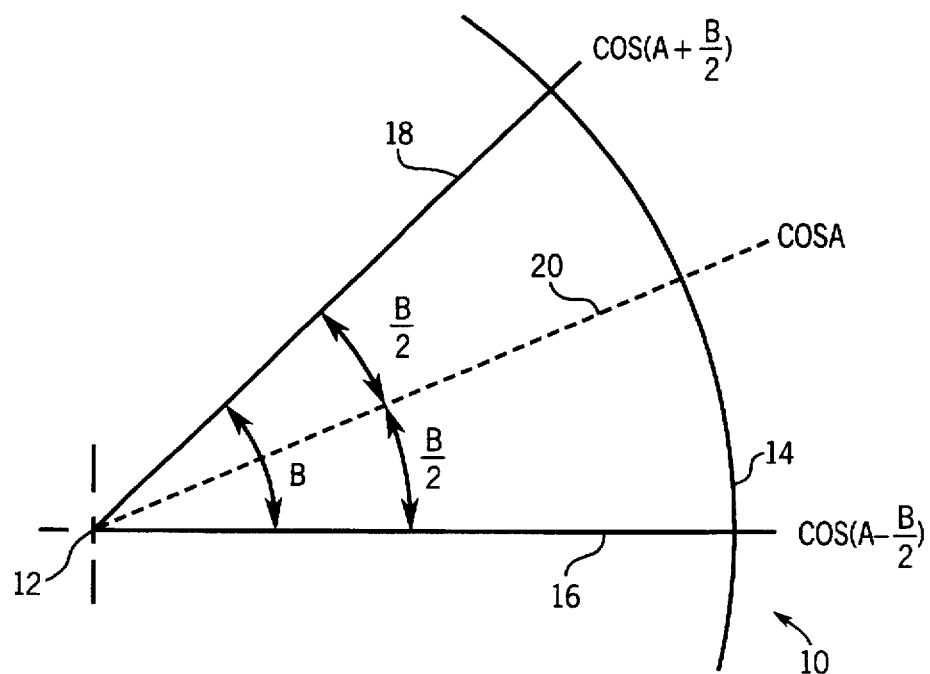
FIG. 1b is a schematic drawing of angles and values employed in approximating the cosine of a bisecting angle of a sector given the cosines of boundary angles of the sector.

FIG. 1b is a schematic drawing of angles and values employed in approximating the cosine of a bisecting angle of a sector given the cosines of boundary angles of the sector.

In FIG. 1b, a unit circle 10 is illustrated as centered on a center point 12. A sector 14 of unit circle 10 is delineated by a lower limit at a radius 16 and an upper limit at a radius 18. Radii 16, 18 are separated by a step angle B. Step angle B is bisected to two half-step angles $$\frac{B}{2}.$$

Thus, a central point in sector 14 is defined as the value cos A at a point where a radius 20 intersects unit circle 10. Radius 20 is defined as a radius displaced from radius 16 by half-step angle $$\frac{B}{2}.$$

Consequently, the lower limit of sector 14 as defined by the intersection of radius 16 with unit circle 10 is a point having a value $$\cos\left(A - \frac{B}{2}\right);$$

the upper limit of sector 14 defined by the intersection of radius 18 with unit circle 10 has a value of $$\cos\left(A + \frac{B}{2}\right).$$

Equation (3) may be rewritten to fit the scheme of FIG. 1 as follows:

$$\cos\left(A + \frac{B}{2}\right) = 2\cos A \cos\frac{B}{2} - \cos\left(A - \frac{B}{2}\right) \quad (29)$$

Solving for cos A:

$$\cos A = \frac{\cos\left(A+\frac{B}{2}\right)+\cos\left(A-\frac{B}{2}\right)}{2\cos\frac{B}{2}} \quad (30)$$

In FIG. 1b, $$\cos\left(A+\frac{B}{2}\right) \text{ and } \cos\left(A-\frac{B}{2}\right)$$

are end points of sector 14. Thus, if one knows $$\cos\left(\frac{B}{2}\right)$$

one can solve for cos A. Clearly, one can more finely segment sector 14 by successively bisecting each half-step angle. Thus, the interval between successive radii in defining successively finer sectors may be expressed as $$\cos\left(\frac{B}{2^n}\right).$$

Increasing the value of n will increase accuracy of the model for determining that a root of an equation lies in a sub-dived sector defined by a step angle of $$\cos\left(\frac{B}{2^n}\right).$$

For simplicity of explaining the present invention, the relationships below will be discussed using n=1.
If we let $$x = 1 - \cos\frac{B}{2^n},$$

then Taylor series (Equation (16)) provides $(1-x)^{-1} \approx 1+x$, for small x, so that:

$$\frac{1}{\cos\frac{B}{2^n}} = \frac{1}{1-\left(1-\cos\frac{B}{2^n}\right)} \approx 1+\left(1-\cos\frac{B}{2^n}\right) \quad (31)$$

The inventors have found, by experimentation, that:

$$\left(1-\cos\frac{B}{2}\right) \approx \frac{1}{2}\left(\frac{1-\cos B}{4}\right)^2 + \left(\frac{1-\cos B}{4}\right) \quad (32)$$

Thus, one can closely approximate cos A (the cosine of the angle bisecting sector 14 in FIG. 1) by using Equation (32), and one can approximate a sub-sector to any desired accuracy by further halving the sub-sector.

Figure 2:
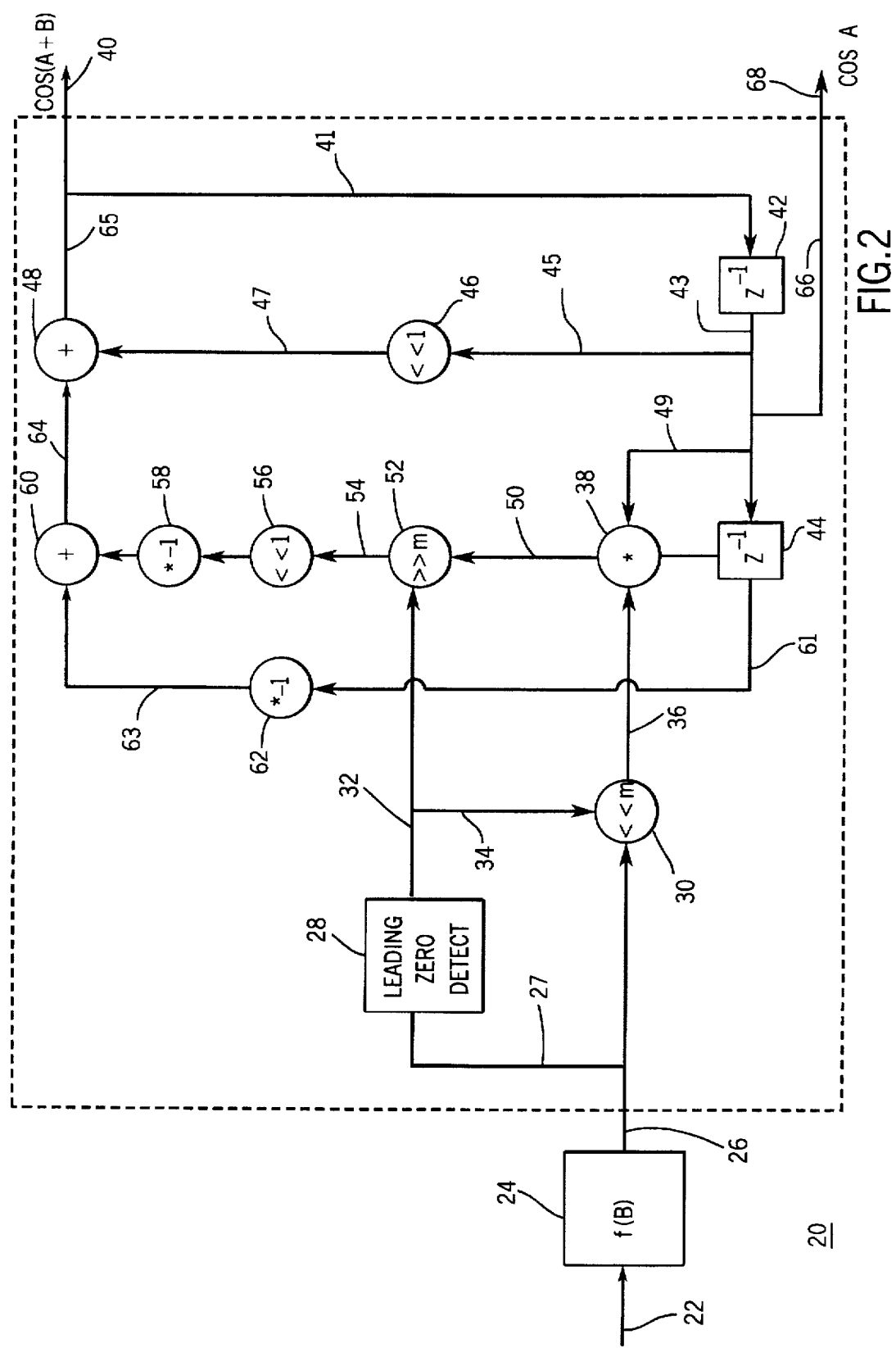
FIG. 2 is a schematic drawing of the preferred embodiment of a waveform generating unit for use in the present invention.

FIG. 2 is a schematic drawing of the preferred embodiment of a waveform generating unit for use in the present invention.

In FIG. 2, a waveform generating unit 20 is illustrated which implements the expression of Equation (4). An input 22 provides an initial value for step angle B to a function generator 24 which provides an output (1−cos B) on a line 26. Function generator 24 may be any known manner of device which takes an input such as a known step angle B and generates the value (1−cos B) therefrom. That is, it may include a read only memory (ROM) or a random access memory (RAM), or a sinusoidal generating unit, or any other units known to those skilled in the art which can generate appropriate sinusoidal values. Line 26 provides the output from function generator 24 to a leading zero detect unit 28 via a line 27, and to a shift unit 30.

The embodiment illustrated in FIG. 2 detects leading zeroes, contemplating storage and treatment of numbers within waveform generating unit 20 in decimal representation. Of course, other representation, storage and treatment formats will require somewhat different scaling techniques, such as detecting a sign bit and leading 1's or leading zeroes according to the value of the sign bit. Any scaling technique appropriate to a value representation approach is contemplated as applicable to and usable in the present invention. Leading zero detection is illustrated here in an exemplary role.

Leading zero detect unit 28 provides an output at line 32 indicating the number m of leading zeros detected in the output provided via line 26, 27 from function generator 24 to leading zero detect unit 28. The number of leading zeros m is provided via a line 34 to shift unit 30 and shift unit 30 shifts m places to the left to effect a binary multiplication of $2^m$ in order to scale the output received via line 26 from function generator 24. Thus, a scaled value $2^m$ (1−cos B) of the output value (1−cos B) on line 26 is provided on line 36 to a multiplier 38. Considering FIG. 1a and FIG. 2 together, one may note that as the phasor, represented by radii 16, 18, 19 rotates counter-clockwise in FIG. 1a, the radius is represented by radius 18 occurs later than radius 16, and the next-occurring phasor in stepping along unit circle 11 in FIG. 1a is represented by radius 19. Radius 19 intersects unit circle 11 at a point represented by the value cos (A+B). Thus, when considering the output 40 of waveform generating unit 20 in FIG. 2, that output representing the value cos (A+B), a delay unit 42 receiving via line 41 the value cos (A+B) will generate on a line 43 the value cos A, since cos A is the once-earlier value of the intersection of the phasor with unit circle 11 as the phasor steps around unit circle 11 by increments measured by step angle B. The signal on line 43 representing the value cos A is provided as an input to delay unit 44, as an input to multiplier 38, and to a scaling unit 46. Scaling unit 46 shifts digits in the signal carried on line 43 to the left one space to effect a binary multiplication by two. Thus, the signal on a line 47 is equal to two times the signal present on input line 45. That is, line 47 carries the value 2 cos A. Line 47 provides that value (2 cos A) as an input to adder 48.

The signal carried on line 36 represents the value $2^m$ (1−cos B) and is provided as a second input to multiplier 38. Multiplier 38 generates a signal on an output line 50 representing a value $2^m$ (cos A (1−cos B)); the signal on line 50 is provided as an input to shift unit 52. Shift unit 52 shifts to the right m places (m being the number of leading zeroes detected by leading zero detect unit 28) to rescale the signal received from multiplier 38 via line 50. Shift unit 52 generates on an output line 54 a signal representing the value cos A (1−cos B), which value is provided as an input to scaling unit 56. A multiplier 58 multiplies the output received from scaling unit 56 by the quantity−1 and provides a signal to adder 60 which represents the value−2 cos A (1−cos B).

Delay unit 44 generates a signal on a line 61 representing the value cos (A−B), which is the next-preceding phasor intersect on the unit circle 11 (see FIG. 1a). The value cos (A−B) is provided to a multiplier 62 which multiplies that value by−1. Multiplier 62 provides a signal on a line 63 representing the value−cos (A−B) as a second input to adder 60.

Of course, for proper operation of waveform generating unit 20, delay unit 42 must be initialized to cos (−B) and delay unit 44 must be initialized to zero to properly initiate operations.

Adder 60 provides a signal on a line 64 representing the value $-2 \cos A (1-\cos B) - \cos (A-B)$ to adder 48. Adder 48 provides a signal on line 65 representing the sum of inputs received via lines 47, 64 [$2 \cos A - 2 \cos A (1-\cos B) - \cos (A-B)$], which (by Equation (4)) equals the value $\cos A+B$. The signal representing the value $\cos A$ is generated via a line 66 from line 43 to an output 68.

In order to facilitate understanding the present invention, like elements will be identified by like reference numerals in the various drawings.

Figure 3:
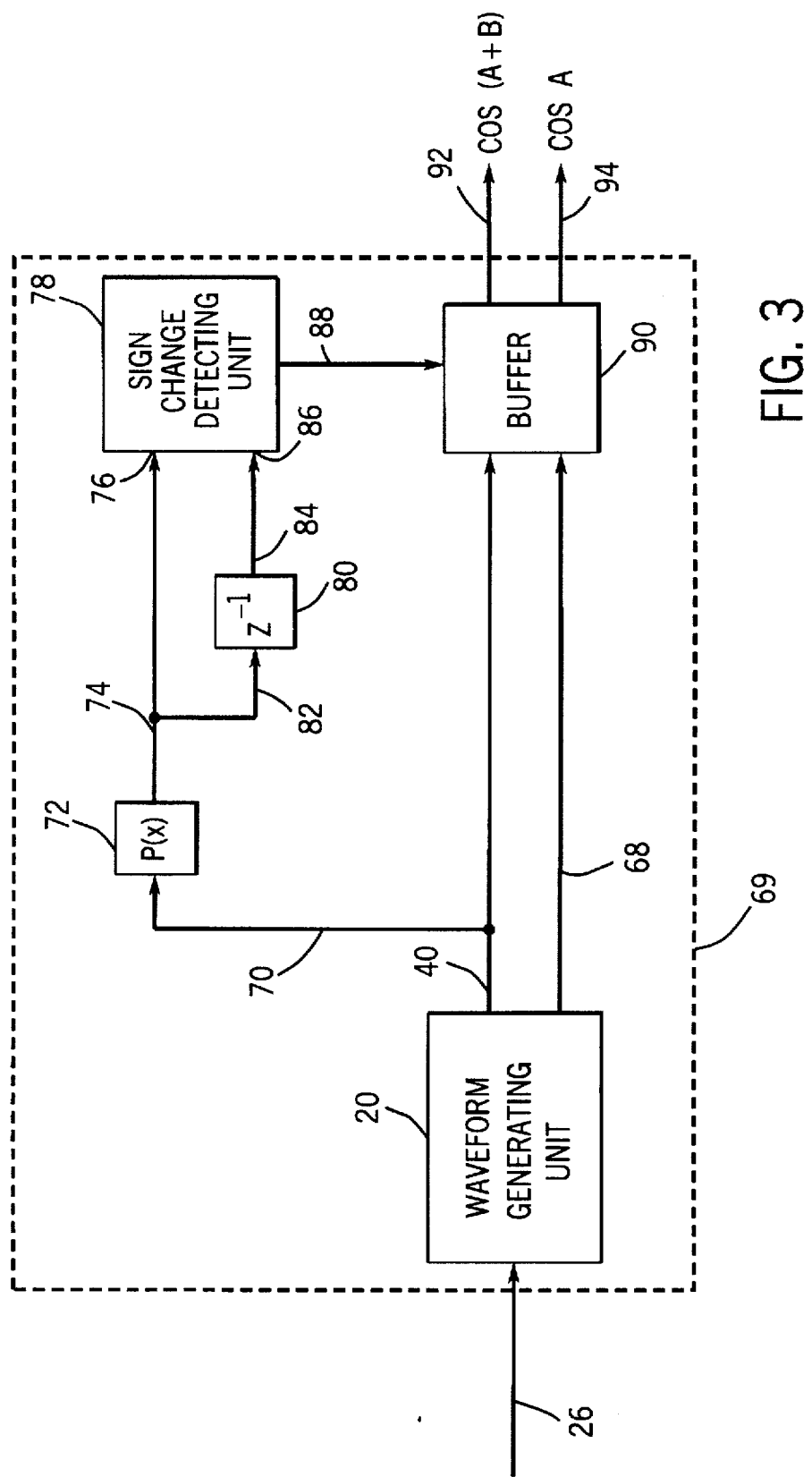
FIG. 3 is a schematic drawing of the preferred embodiment of a polynomial zero crossing detector unit for use in the present invention.

FIG. 3 is a schematic drawing of the preferred embodiment of a polynomial zero crossing detector unit for use in the present invention. In FIG. 3, a polynomial zero crossing detector 69 is illustrated and includes a waveform generating unit 20 of the sort described in connection with FIG. 2. Waveform generating unit 20 receives an input 26 bearing a signal representing the value $(1-\cos B)$. Waveform generating unit 20 generates the value $\cos (A+B)$ at an output 40, and generates a value $\cos A$ at an output 68.

A line 70 delivers the value $\cos (A+B)$ from line 40 to a polynomial treating unit 72. Polynomial treating unit 72 receives the value $\cos (A+B)$ via line 70. Polynomial treating unit 72 evaluates the polynomial (preferably, in the present embodiment of the invention, a line spectrum pair polynomial) for the value received on line 70 and generates an evaluation value of that particular polynomial treated by polynomial treating unit 72 on an output line 74. The evaluation value of the particular polynomial treated by polynomial treating unit 72 for the value provided via line 70 is provided at an input 76 of a sign change detecting unit 78. A delay unit 80 also receives the output from polynomial treating unit 72 via a line 82 and generates an evaluation value for evaluation of the polynomial treated by polynomial treating unit 72 during a once-previous time. That is, the output of delay unit 80 on line 84 is an evaluation value for the polynomial treated by the polynomial treating unit 72 at the value $\cos A$. This evaluation value for the polynomial at value $\cos A$ is provided to an input 86 of sign change detecting unit 78. Sign change detecting unit sends a sign change detected signal via a line 88 to a buffer 90.

Buffer 90 also receives via line 40 the value $\cos (A+B)$, and via line 68 the value $\cos A$. The sign change detected signal provided via line 88 to buffer 90 switches buffer 90 on when there is a sign change detected by sign change detecting unit 78. Output 92 of buffer 90 generates an output representing the value $\cos (A+B)$, and output 94 of buffer 90 generates an output representing the value $\cos A$. Outputs 92, 94 are updated when a sign change is detected by sign change detector 78 and a sign change detected signal is provided via line 88 to buffer 90. Stated another way, the values of $\cos A+B$ (on line 40) and $\cos A$ (on line 68) are gated through buffer 90 to outputs 92, 94 when sign change detecting unit 78 detects a sign change between its signals received at inputs 76 and 86 and sends a sign change detected signal via line 88 to turn on buffer 90. As a result, the signals provided at outputs 92, 94 from buffer 90 are such that a zero (i.e., a root) of the polynomial treated by polynomial treating unit 72 lies between the angles A and (A+B), which are represented by the values $\cos A$ and $\cos (A+B)$.

Figure 4:
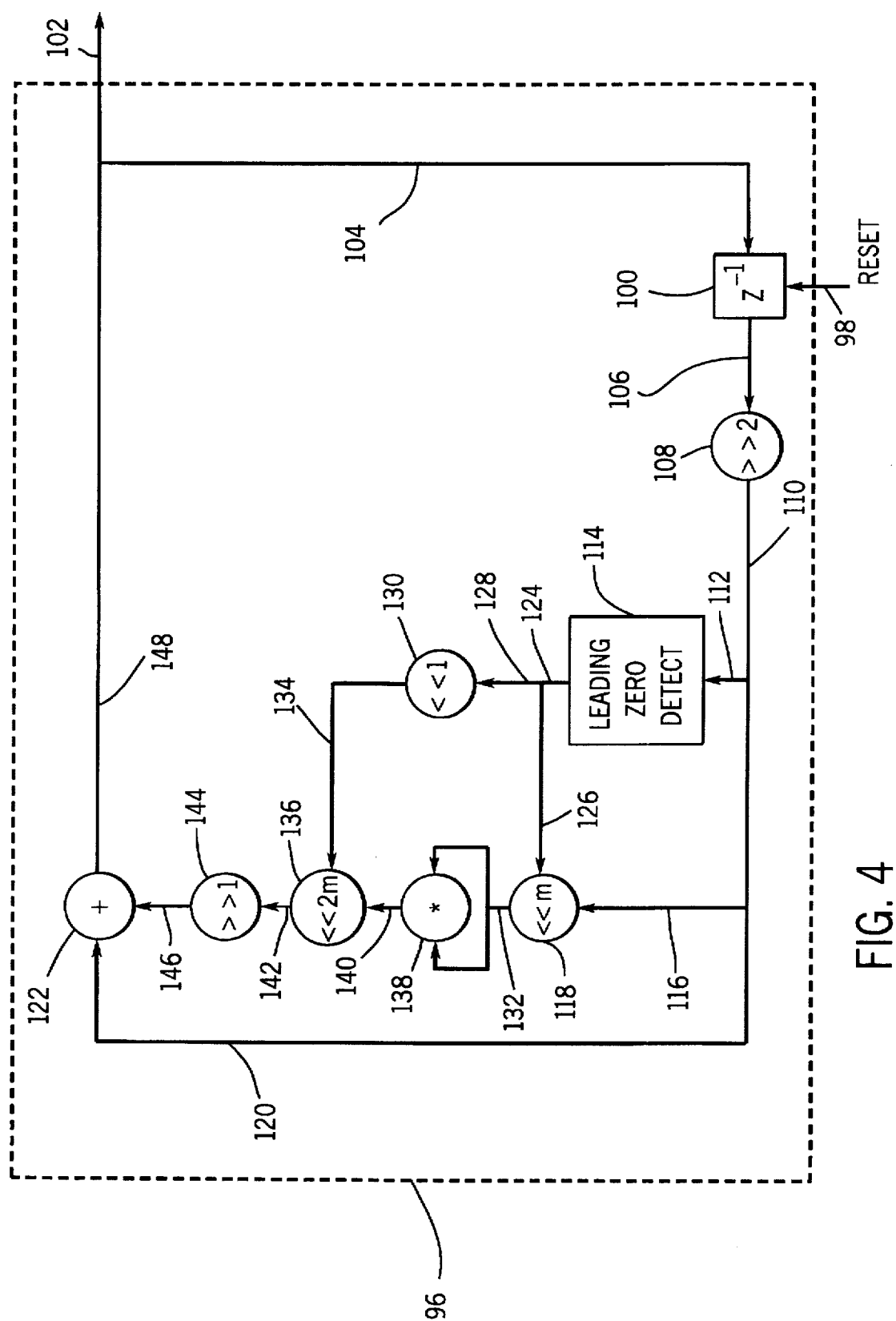
FIG. 4 is a schematic drawing of the preferred embodiment of a half-angle generating unit for use in the present invention.

FIG. 4 is a schematic drawing of the preferred embodiment of a half-angle generating unit for use in the present invention. In FIG. 4, a half-angle generating unit 96 implements the expression of Equation (32). Thus, the output 102 of half-angle generating unit 96 carries a signal representing the value $$1 - \cos \frac{B}{2^{n+1}}.$$

This signal is also applied via a line 104 to a delay unit 100. Delay unit 100 presents at its output line 106 a signal representing the value $$1 - \cos \frac{B}{2^n}.$$

Reset values are occasionally provided to delay unit 100 via a line 98 representing the value $(1-\cos B)$. The output carried on line 106 is applied to a scaling unit 108 which shifts digits to the right two places to effect a division of the signal received via line 106 by four. Thus, the output of scaling unit 108 carried on line 110 is a signal which represents the value $$\frac{1 - \cos \frac{B}{2^n}}{4}.$$

That signal is applied via a line 112 to a leading zero detect unit 114, is applied via a line 116 to a shift unit 118, and is applied via a line 120 to a summing unit 122. Leading zero detect unit 114 generates at an output line 124 a signal representing m, the number of leading zeros detected in the value received via line 112. As described before in discussing leading zero detection, any scaling apparatus appropriate for scaling numbers represented in a given format may be employed in place of leading zero detect unit 114.

The value m is applied via a line 126 to shift unit 118, and via a line 128 to a scaling unit 130. Shift unit 118 shifts digits contained in the signal received via line 116 to the left m places to effect a multiplication by the quantity $2^m$ so that the output generated on line 132 from shift unit 118 represents the value $$2^m \left( \frac{1 - \cos \frac{B}{2^n}}{4} \right).$$

Scaling unit 130 effects a shift to the left by one place to effect a multiplication by 2 to generate on a line 134 a signal representing the value $2m$. The value $2m$ is applied via line 134 to a shift unit 136. The signal carried on line 132 is applied to a squaring unit 138. Squaring unit 138 generates an output signal line 140 representing the value $$2^{2m} \left( \frac{1 - \cos \frac{B}{2^n}}{4} \right)^2.$$

The signal is applied via line 140 to shift unit 136; shift unit 136 generates an output signal on line 142 representing the value received via line 140 divided by $$2^{2m} \left( \frac{1 - \cos \frac{B}{2^n}}{4} \right)^2.$$

A scaling unit 144 shifts digits in signals received via line 142 to the right one place to effect a division by 2 so that signals carried on an output line 146 from scaling unit 144 to summing unit 122 represent the value $$\frac{1}{2}\left(\frac{1-\cos\frac{B}{2^n}}{4}\right)^2.$$

Summing unit 122 generates on an output line 148 the value $$\frac{1}{2}\left(\frac{1-\cos\frac{B}{2^n}}{4}\right)^2 + \left(\frac{1-\cos\frac{B}{2^n}}{4}\right).$$

As we know from Equation (31), that approximately equals $1-\cos B/2^{n+1}$.

Figure 5:
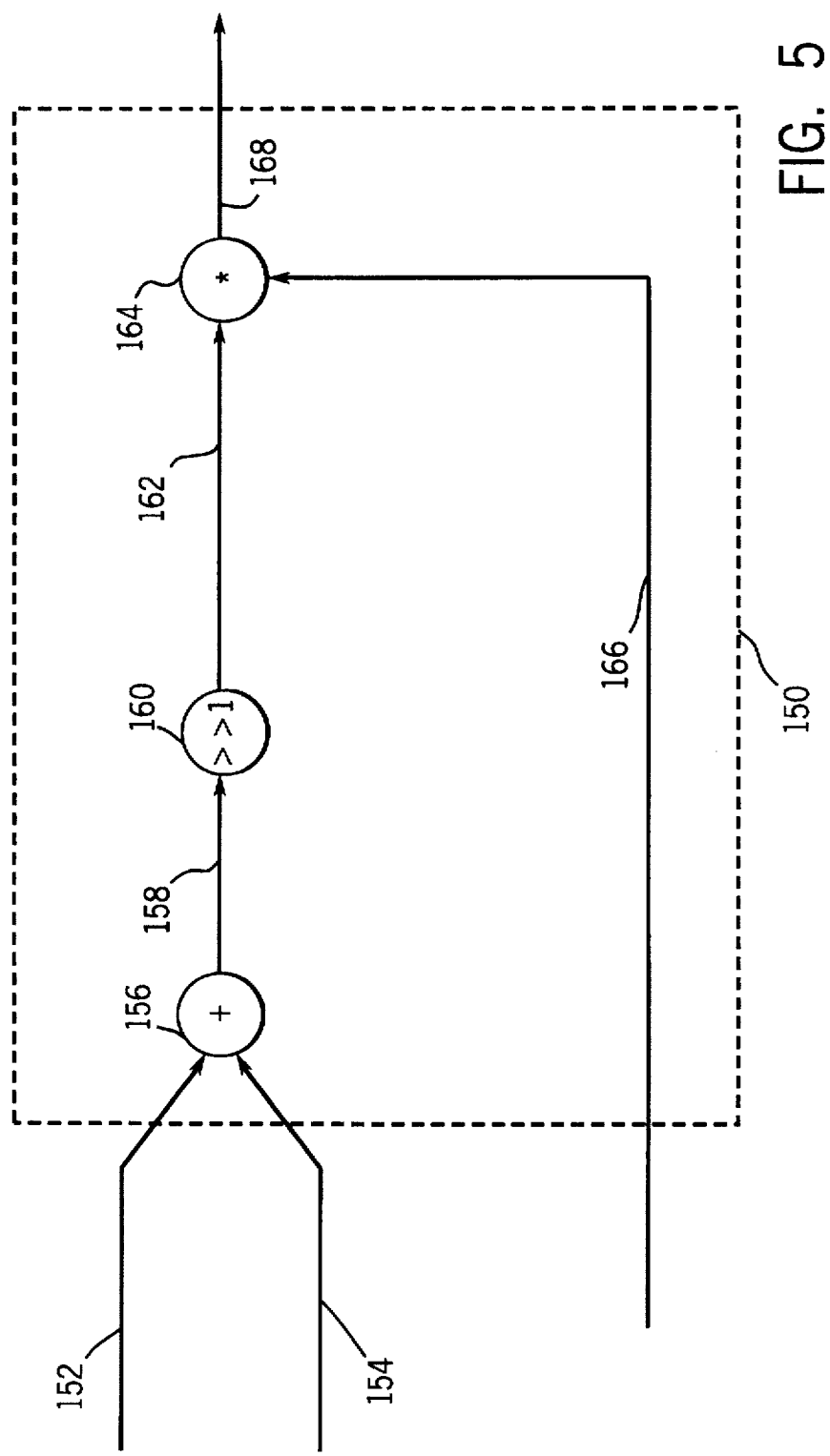
FIG. 5 is a schematic drawing of the preferred embodiment of an angle bisecting unit for use in the present invention.

FIG. 5 is a schematic drawing of the preferred embodiment of an angle bisecting unit for use in the present invention. In FIG. 5, an angle bisecting unit 150 implements the expression of Equation (22). Angle bisecting unit 150 receives two inputs 152, 154 which are appropriate for connection with outputs 92, 94 of the polynomial zero crossing detector unit 69 illustrated in FIG. 3. Preferably, input 152 receives a signal representing the value cos (A+B), and input 154 receives a signal representing the value cos A. Both inputs 152, 154 are applied to a summing unit 156. Summing unit 156 generates a signal on a line 158 which represents the value cos (A+B)+cos A. The signal is applied to a scaling unit 160. Scaling unit 160 shifts digits contained in the signal provided on line 158 to the right one space, thereby effecting a binary division by two so that scaling unit 160 generates on a line 162 a signal representing the value $$\frac{\cos(A+B)+\cos A}{2}.$$

Line 162 is connected to a multiplier 164. A second input to multiplier 164 is provided via a line 166. Line 166 carries a signal representing the value $$1+\left(1-\cos\frac{B}{2}\right).$$

Thus, the output line 168 from multiplier 164 carries a signal representing the value $$\frac{\cos(A+B)+\cos A}{2}\cdot\left(1+\left(1-\cos\frac{B}{2}\right)\right).$$

According to Equation (22), that value equals $$\cos\left(A+\frac{B}{2}\right).$$

Figure 6:
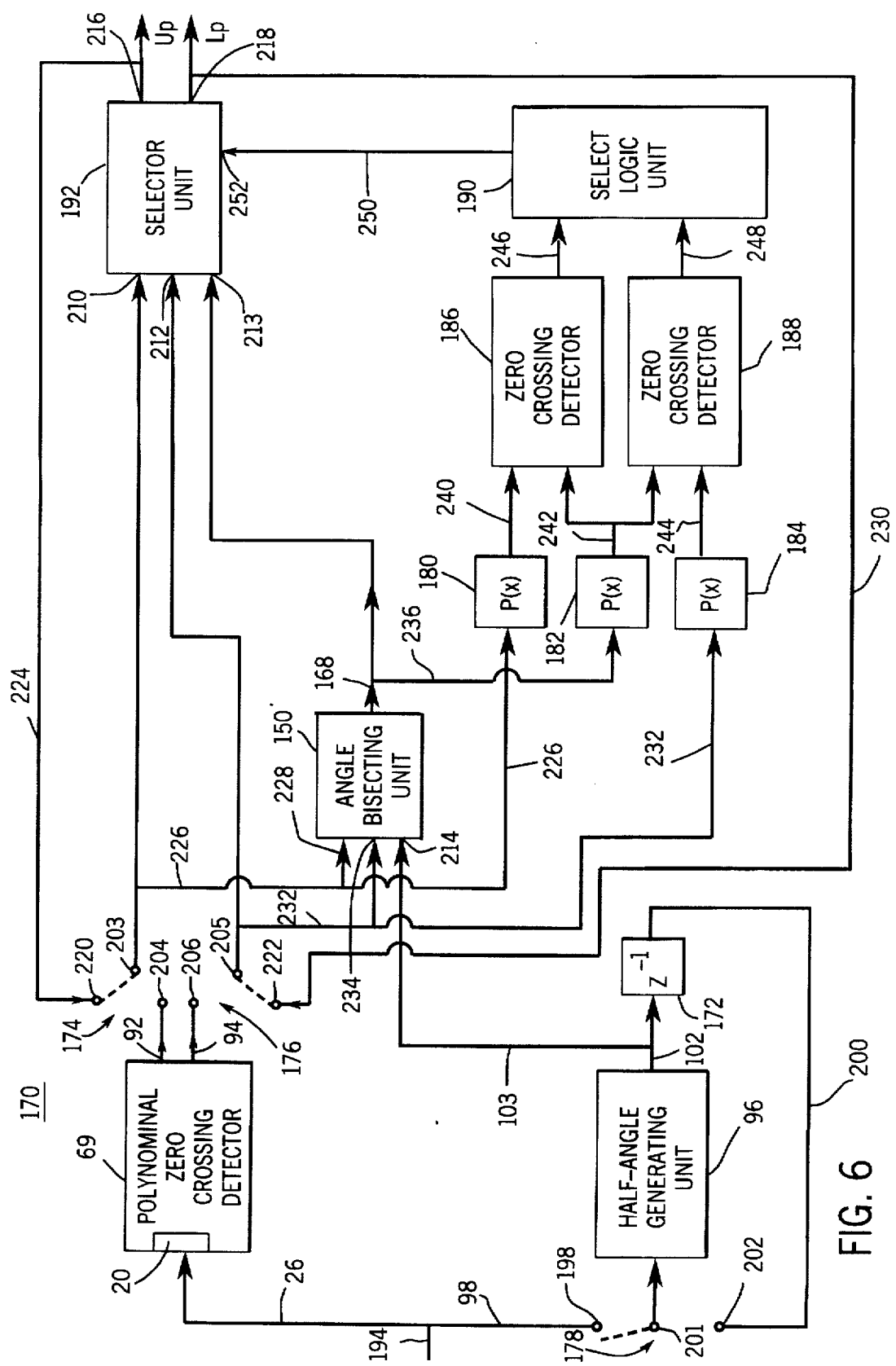
FIG. 6 is a schematic drawing of the preferred embodiment of the apparatus of the present invention.

FIG. 6 is a schematic drawing of the preferred embodiment of the apparatus of the present invention.

In FIG. 6 a root determining apparatus 170 is illustrated which includes a polynomial zero crossing detector 69 (FIG. 3), which includes a waveform generating unit 20 (FIG. 2); a half-angle generating unit 96 (FIG. 4); a delay unit 172; and switches 174, 176, 178. Also included in root determining apparatus 170 are an angle bisecting unit 150 (FIG. 5); polynomial treating units 180, 182, 184; zero crossing detectors 186, 188; a select logic unit 190; and a selector unit 192.

An input is provided to root determining apparatus 170 via a line 194 in the form of a signal representing the value 1−cos B. This input signal is provided via a line 26 to waveform generator 20 in polynomial zero crossing detector 69, and is also provided via a line 98 and a pole 198 of switch 178 to half-angle generating unit 96.

Half-angle generating unit 96 generates a signal on a line 102 representing the value $$1-\cos\frac{B}{2^{n+1}}$$

and provides that signal to delay unit 172 as well as to an input 214 of angle bisecting unit 150. Delay unit 172 generates a signal on a line 200 representing the value $$1-\cos\frac{B}{2^n}$$

and applies that value to a pole 202 of switch 178.

Polynomial zero crossing detector 69 provides at its output 92 a signal representing the value cos (A+B), and applies that value to a pole 204 of switch 174. Polynomial zero crossing detector 69 also generates a signal on its output 94 representing the value cos A, and applies that signal to a pole 206 of switch 176. Of course, recalling the explanation of polynomial zero crossing detector 69 in connection with FIG. 3, polynomial crossing detector 69 ensures that the values represented by the signals generated on outputs 92, 94 bracket a zero solution of the line spectrum pair polynomial treated by the polynomial treating unit 72 (FIG. 3) in polynomial zero crossing detector 69.

Switches 174, 176, 178 are arranged for accommodating initial setup of root determining apparatus 170 in a first orientation and for accommodating segmenting operations of root determining apparatus 170 in a second orientation. Thus, when switch 174 connects pole 203 with pole 204, and when switch 176 connects pole 205 with pole 206, and when switch 178 connects pole 201 with pole 198, then root determining apparatus 170 is configured for initial/reset operation. In the initial/reset operation configuration, the signal on output 92 is provided to a selector unit 192 at a selector unit input 210, and the signal on output 94 is applied to a selector unit input 212 of selector unit 192. Similarly, in the initial/reset operation configuration, the input carried on line 98 representing the value 1−cos B is applied to half-angle generating unit 96.

The signal generated by half-angle generating unit 96 on line 102 is provided via a line 103 to an input 214 of angle bisecting unit 150. Angle bisecting unit 150 provides at its output 168 (FIG. 5) a signal representing the value $$\cos\left(A+\frac{B}{2}\right),$$

which is applied to a selector unit input 213 of selector unit 192.

In the initial/setup operation configuration wherein output 92 is connected via poles 203, 204 with selector unit input 210, and wherein output 94 is connected via poles 205, 206 with selector unit input 212, selector unit 192 selects input signals representing the quantity cos (A+B) for application to its output 216 as the upper limit $U_p$ of a sector (such as sector 15 of FIG. 1a) and selector unit 192 selects signals representing the quantity cos A from selector unit input 212 for application to its output 218 to represent the lower limit $L_p$ of a sector such as sector 15 of FIG. 1a. In such an initial/setup operation configuration, selector unit 192 does not consider signals appearing at its input 213 for application to its outputs 216, 218.

So long as the initial, or coarse, solution of the location of roots is sufficient without further bisection of a sector (such as sector 15 of FIG. 1a) root determining apparatus 170 does not involve angle bisecting unit 150 in determining upper limit $U_p$ and lower limit $L_p$ outputs for its outputs 216, 218. Following the initial determination of the first sector 15 established by upper limit $U_p$ and lower limit $L_p$ by root determining apparatus 170, the next iteration of parameters is generated and dealt with, and root determining apparatus 170 remains in its initial/reset operation configuration as root determining apparatus 170 "steps around" unit circle 11 in increments established as sectors 15, 17 (FIG. 1a). This is so in the case where the coarse (or first cut) estimation of location of roots on the unit circle suffices and there is no need to further segment sector 15 (FIG. 1a) to more finely determine location of roots on unit circle 11.

If a finer segmentation of sector 15 is required to more accurately locate roots on unit circle 11, then switch 174 is reoriented to connect pole 203 with pole 220, switch 176 is reoriented to connect pole 205 with pole 222, and switch 178 is reoriented to connect pole 201 with pole 202. In such a segmenting operations configuration, angle bisecting unit 150 is operationally included in root determining apparatus 170 so that upper limit Up is provided via a feedback line 224 and a line 226 to an input 228 of angle bisecting unit 150. Similarly, lower limit $L_p$ is provided via a feedback line 230 and a line 232 to an input 234 of angle bisecting unit 150. Still further, input from delay unit 172 is provided via line 200 and via switch 178 to the input of half-angle generating unit 96.

Still further, line 226 provides upper limit Up to a polynomial treating unit 180, line 232 provides lower limit to polynomial treating unit 184, and output 168 (representing $$\cos\left(A+\frac{B}{2}\right))$$

from bisecting unit 150 is provided via a line 236 to a polynomial treating unit 182. Polynomial treating units 180, 182, 184 preferably are similar to polynomial treating unit 72 (FIG. 3) in that they each provide an evaluation value to the polynomial for which roots are sought by root determining apparatus 170 for the values provided via their respective input lines 226, 236, 232. Thus, an evaluation value for the polynomial for which roots are sought by root determining apparatus 170 is provided for the value received via line 226 by polynomial treating unit 180 on an output line 240 to a zero crossing detector 186. An evaluation value for the polynomial for which roots are sought is provided for the value received via input 236 by polynomial treating unit 182 on an output 242 to zero crossing detector 186 and to a zero crossing detector 188. Similarly, an evaluation value for the polynomial for which roots are sought is provided for the value provided via input 232 on an output line 244 to zero crossing detector 188.

Zero crossing detector 186 provides an output via a line 246 to a select logic unit 190, and zero crossing detector 188 provides an output via a line 248 to select logic unit 190. Thus, select logic unit 190 receives an indication via lines 246, 248 whether a zero crossing occurs between the values cos (A+B) and $$\cos\left(A+\frac{B}{2}\right)$$

(via line 246) or whether a zero crossing occurs between the values cos A and $$\cos\left(A+\frac{B}{2}\right)$$

(via line 248). That is, select logic unit 190 selects values to define the interval containing the zero crossing: an upper half-sector between lower limit $$\cos\left(A+\frac{B}{2}\right)$$

and upper limit cos (A+B), or a lower half-sector between lower limit cos A and upper limit $$\cos\left(A+\frac{B}{2}\right).$$

A signal is provided by select logic unit 190 via a line 250 to an input 252 to selector unit 192 indicating which half-sector contains the zero crossing.

Selector unit 192 contains logic which (1) defines a sector having an upper limit $U_p$ (on output 216) set to the value received via input 213

$$\left[\cos\left(A+\frac{B}{2}\right)\right],$$

and having a lower limit $L_p$ (on output 218) set to the value received via input 212 [cos A] when the input from select logic unit 192 via line 250 indicates that the zero crossing occurred in the lower half-sector bounded by cos A and $$\cos\left(A+\frac{B}{2}\right);$$

or (2) defines a sector having an upper limit $U_p$ set to the value received via input 210 [cos A+B], and having a lower limit $L_p$ set to the value received via input 213

$$\left[\cos\left(A+\frac{B}{2}\right)\right]$$

when select logic unit 190 outputs a signal to selector unit 192 via line 250 that indicates the zero crossing occurred in the upper half-sector bounded by values $$\cos\left(A+\frac{B}{2}\right)$$

and cos (A+B).

If further refinement of accuracy in determining the location of a root on unit circle 11 is required, delay unit 172 delivers via line 200 and switch 178 to the input of half-angle generating unit 96 a signal representing $$1-\cos\frac{B}{2^n}.$$

Half-angle generating unit 96 provides a signal representing $$1-\cos\frac{B}{2^{n+1}}$$

to input 214 of angle bisecting unit 150 via lines 102, 103. Angle bisecting unit 150 uses inputs received at input 214 to further bisect sector 15 whereby each half-sector is now reestablished as a newly-defined sector having an upper limit Up and a lower limit $L_p$, which is then bisected. Zero crossing is determined to be either in the lower half-sector (line 248 to select logic 190) or in the upper half-sector (line 246 to select logic unit 190) of one of the newly-defined sectors. Selector unit 192 proceeds with the half-sector containing a zero crossing as a next-newly-defined sector for the next bisecting iteration.

Figure 7:
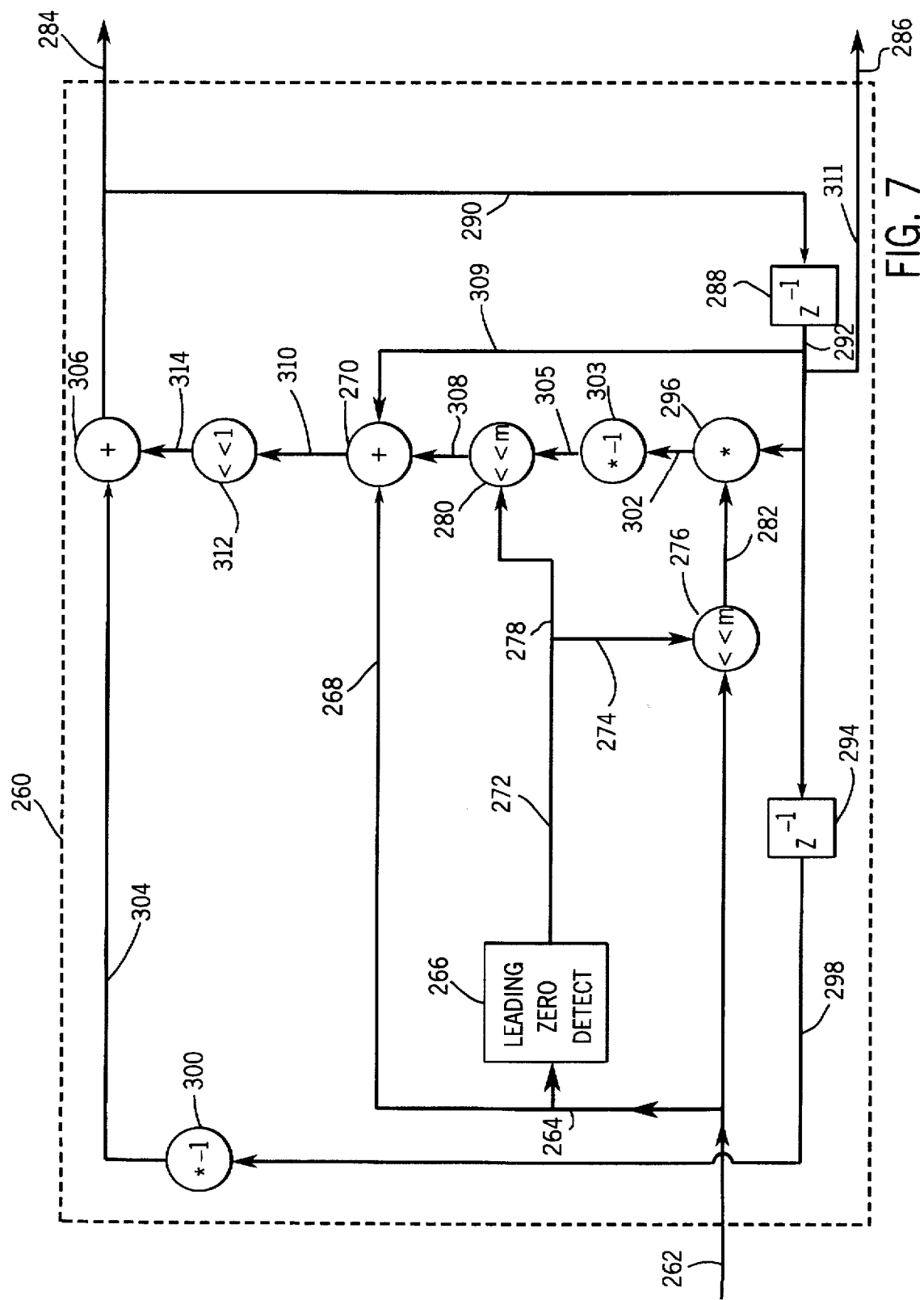
FIG. 7 is a schematic diagram of an alternate embodiment of a waveform generating unit for use in the present invention.

FIG. 7 is a schematic diagram of an alternate embodiment of a waveform generating unit for use in the present invention.

In particular, FIG. 7 illustrates a waveform generating unit for use in the present invention when angles A and B are small enough that leading nines in the quantities cos A or cos B indicate it is useful to use quantities (1−cos A) or (1−cos B) in their place to ensure that all digits used to represent the required values in root determination operations are significant digits. Thus, FIG. 7 implements Equation (28) to enable one to configure a waveform generator accurately for small angle increments for implementation of the present invention.

In FIG. 7, a waveform generating unit 260 receives an input on a line 262 representing the quantity (1−cos B). The input received via line 262 is provided via a line 264 to a leading zero detect unit 266 and, via a line 268, to a summing unit 270. Leading zero detect unit 266 generates an output on a line 272 representing the number m of leading zeroes detected in the input received via line 264. As described before regarding leading zero detection, leading zero detect unit 266 may be replaced by any scaling apparatus appropriate to the number format used. The signal representing m is applied via a line 274 to a scaling unit 276, and is provided via a line 278 to a scaling unit 280.

The input signal applied at input line 262 is applied to scaling unit 276 so that scaling unit 276 provides a signal on line 282 representing the signal received via line 262 multiplied times $2^m$.

The output signal provided at output 284 of waveform generating unit 260 is a signal representing the quantity 1−cos (A+B), and the output signal provided at output 286 is a signal representing the quantity 1−cos A. Delay unit 288 receives the signal provided at output 284 via a feedback line 290 so that the output provided on line 292 from delay unit 288 is a signal representing the quantity 1−cos A. That signal is provided to a delay unit 294, to a multiplier 296, and to output 286 via a line 311. Of course, delay units 288, 294 must be appropriately initialized to ensure proper operation of waveform generating unit 260.

Delay unit 294 generates a signal on an output line 298 representing the quantity 1−cos (A−B), which signal is applied to a multiplier 300. Multiplier 300 effects a multiplication by the quantity−1. Multiplier 296 multiplies the value received via line 282 (i.e., $2^m$ (1−cos B)) times the value received via line 292 (i.e., 1−cos A) and generates a signal on a line 302 representing the quantity $2^m$ (1−cos A) (1−cos B). Multiplier 303 multiplies the value received via line 302 by the quantity −1, and produces on line 305 a signal representing the quantity−$2^m$ (1−cos A)(1−cos B).

Multiplier 300 generates a signal on a line 304 representing the quantity−(1−cos (A−B)). The signal carried on line 304 is applied to a summing unit 306. The signal carried on line 305 is applied to scaling unit 280. Scaling unit 280 provides a signal on line 308 representing the signal received via line 302 divided by $2^m$, so that scaling unit 280 generates on line 308 a signal representing the value−(1−cos A) (1−cos B), which signal is applied to summing unit 270. The signal carried on line 292 representing 1−cos A is also applied via a line 309 to summing unit 270. Summing unit 270 generates a signal on a line 310 representing the value−(1−cos A) (1−cos B)+(1−cos A)+(1−cos B).

The signal carried on line 310 is applied to a scaling unit 312 to multiply the signal received via line 310 times 2. Scaling unit 312 generates a signal on a line 314 representing the value 2 ((1−cos A)−(1−cos A) (1−cos B)+(1−cos B)). The signal carried on line 314 is applied to summing unit 306 so that summing unit 306 generates on output line 284 a signal representing the quantity 2 ((1−cos A)−(1−cos A) (1−cos B)+(1−cos B))−(1−cos (A−B)).

We know from Equation (28) that the quantity represented by the signal on line 284 equals the value 1−cos (A+B).

Figure 8:
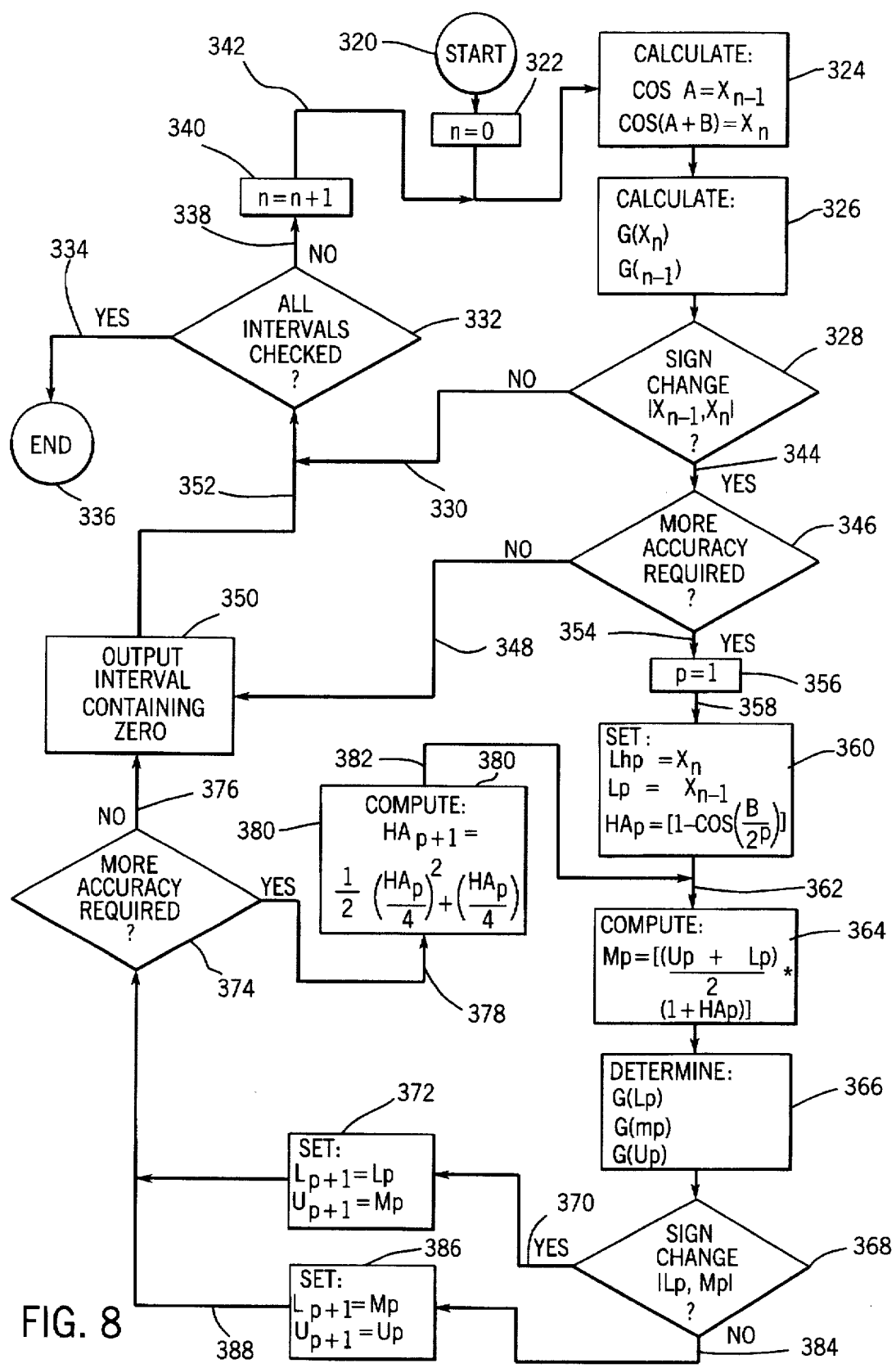
FIG. 8 is a flow diagram illustrating the preferred embodiment of the method of the present invention.

FIG. 8 is a flow diagram illustrating the preferred embodiment of the method of the present invention. In FIG. 8, the method begins with "Start" at block 320 and a counter n is set to 0 at block 322. The values cos A and cos (A+B) are calculated (or retrieved from storage, or otherwise determined) in block 324 and are employed in block 326 to determine a solution for the polynomial G(X) for each of the two values (cos A=$X_{n-1}$, and cos (A+B)=$X_n$). By block 328 an inquiry is made whether a sign change occurred in the values of the polynomial G(X) in the interval between $X_{n-1}$ and $X_n$.

If no sign change has occurred, then no root is present in the interval then being investigated and the "No" branch 330 is taken to decision block 332 where a check is made whether all intervals on unit circle 11 (FIG. 1a) have been checked.

If all intervals have been checked, the "Yes" branch 334 is taken to "END" 336. If not all intervals have been checked, then "No" branch 338 is taken from decision block 332, counter n is incremented by block 340 and fed back via branch 342 to block 324 for recalculation of a new interval $X_{n-1}$, $X_n$. If the response in decision block 328 regarding presence of a sign change in the interval being considered is affirmative, the method proceeds via "Yes" branch 344 to decision block 346 where inquiry is made whether greater accuracy is required in determining location of the root found in decision block 328. If no further accuracy is required, the "No" branch 348 is taken to a function block 350 which effects outputting the interval containing the root ($X_{n-1}$, $X_n$) and then proceeds via branch 352 to decision block 332 for determination whether all intervals on unit circle 11 have been checked. Subsequent decisions and operations occur as described above in connection with answers to the query posed by decision block 332.

If it is decided at decision block 346 that more accuracy is required, then "Yes" branch 354 is taken. A counter p is set at block 356 and provided via branch 358 to block 360. In block 360, an upper limit $U_p$ is set equal to $X_n$, a lower limit $L_p$ is set equal to $X_{n-1}$, and a half-angle increment HAP is set equal to $$\left(1 - \cos \frac{B}{2^p}\right),$$

initially p=1. These values are provided via a branch 362 to a block 364. Block 364 implements Equation (22), where the value of upper limit $U_p$ is equal to the value cos (A+B) and the value of lower limit $L_p$ is equal to the value cos A. The value $M_p$ indicated in block 364 is the midpoint of the particular segment being addressed by block 364 and equals the value $$\cos\left(A + \frac{B}{2}\right).$$

Using the values computed in blocks 360, 364, block 366 evaluates the polynomial G(X) for those values and provides evaluation values to decision block 368.

Decision block 368 determines whether there is a sign change in the interval between lower limit $L_p$ and midpoint $M_p$. If there is such a sign change, then the root of the polynomial G(X) is in the lower half-sector in the interval $L_p$, $M_p$ of the sector determined in block 324 and bounded by $X_{n-1}$, $X_n$. "Yes" branch 370 is taken so that the next iterative sector limits for possible subsequent bisecting of the sector are established in block 372 for a newly-defined sector: a newly-defined lower limit $L_{p+1}$ being set at the original lower limit $L_p$, and a newly-defined upper limit $U_{p+1}$ being set at the midpoint $M_p$. Those newly-defined limit values $L_{p+1}$, $U_{p+1}$ are provided to decision block 374 and inquiry is made whether further accuracy is required. If no further accuracy is required, "No" branch 376 is taken to block 350 where the interval containing the root (now defined by newly-defined lower limit $L_{p+1}$ and newly-defined upper limit $U_{p+1}$) is output and the method proceeds via branch 352 to query whether all intervals are checked (decision block 332). Subsequent decisions and operations occur as previously described in connection with answers to the query posed by decision block 332.

If further accuracy is required, "Yes" branch 378 is taken to block 380 in which the half-angle increment $HA_{p+1}$ for the next iteration of accuracy (i.e., next bisection of the newly-defined sector established in block 372) is calculated implementing Equation (32). The newly calculated half-angle increment $HA_{p-1}$ is provided via branch 382 to block 364 for calculating of a new midpoint $M_p$. Determination of evaluation values of the polynomial G(X) is effected in block 366 for a new lower limit $L_p$ (as determined in block 372), a new midpoint $M_p$ (as determined in block 364), and a new upper limit $U_p$ (as determined in block 372). The method may continue in this loop (from decision block 368, to block 372, to decision block 374, to block 380, to block 364, and to block 366) until the response to the query posed by decision block 374 is negative, indicating that sufficient accuracy had been achieved in root location determination, whence the method proceeds via "No" branch 376 from decision block 374 as previously described.

If decision block 368 determines that no sign change has occurred in the interval $L_p$, $M_p$, then "No" branch 384 is taken from decision block 368 to block 386. In block 386 a newly-defined lower limit $L_{p+1}$ is set at midpoint $M_p$ and a newly-defined upper limit $U_{p+1}$ is set at upper limit $U_p$. Those newly-defined limits $L_{p+1}$, $U_{p+1}$ delimit a newly-defined sector established by block 386 which is the upper half-sector of the sector defined in block 360. Block 386 provides these newly-defined limit values via a branch 388 to decision block 374 and the method proceeds thereafter as previously described.

It is to be understood that, while the detailed drawings and specific examples given describe preferred embodiments of the invention, they are for the purpose of illustration, that the apparatus and method of the invention are not limited to the precise details and conditions disclosed and that various changes may be made therein without departing from the spirit of the invention which is defined by the following claims.

What is claimed is:

1. An apparatus for analyzing speech signals to determine parameters expressive of characteristics of the speech signals, comprising:

a linear predictive coding (LPC) analysis unit configured to convert speech signals to LPC parameters;

a transformation unit configured to transform said LPC parameters to a corresponding line spectrum pair (LSP) expression;

a waveform generating unit, said waveform generating unit having a first input for receiving a representation of an initial value for locating a first site on said unit circle, and having a second input for receiving a representation of a step value for defining an arc-distance on said unit circle; said waveform generating unit generating a plurality of intervals on said unit circle, each interval of said plurality of intervals having a lower limit and an upper limit, said plurality of intervals including an initial interval and a plurality of succeeding intervals; said lower limit of said initial interval being said initial value, said upper limit of said initial interval being displaced on said unit circle from said initial value by said arc-distance; each respective succeeding interval of said plurality of succeeding intervals having its respective lower limit coincident with said upper limit of the next-preceding interval of said plurality of intervals, each said respective succeeding interval having its respective upper limit displaced on said unit circle from its respective lower limit by said arc-distance; and a polynomial zero detecting unit coupled with said waveform generating unit, said polynomial zero detecting unit receiving said plurality of intervals and evaluating said line spectrum pair expression for at least said upper limit and said lower limit of each said respective interval of said plurality of intervals; said polynomial zero detecting unit recognizing presence of a respective root of said plurality of roots when said line spectrum pair expression changes sign within a particular interval of said plurality of intervals, said polynomial zero detecting unit designating each said particular interval as a solution interval; said polynomial zero detecting unit generating said lower limit and said upper limit of each said solution interval; wherein the plurality of roots present in said solution intervals express the characteristics of the speech signals.

2. An apparatus for analyzing speech signals as recited in claim 1 wherein the apparatus further comprises:

a half distance generating unit coupled with said second input of said waveform generating unit, said half distance generating unit generating a half-arc-distance, said half-arc-distance being one-half said arc-distance;

an angle bisecting unit coupled with said half distance generating unit and coupled with said polynomial zero detecting unit, said angle bisecting unit receiving said solution interval and receiving said half-arc-distance; said angle bisecting unit performing a bisecting operation defining a lower refined solution interval and an upper refined solution interval, said lower refined solution interval having a lower refined lower limit at said lower limit of said solution interval and having a lower refined upper limit displaced on said unit circle from said lower refined lower limit said half-arc-distance; said upper refined solution interval having an upper refined upper limit at said upper limit of said solution interval and having an upper refined lower limit displaced on said unit circle from said upper refined upper limit said half-arc-distance; and a selection unit coupled with said angle bisecting unit and with said polynomial zero detecting unit; said selection unit generating a lower limit output and an upper limit output appropriately to indicate whether said respective root is located in said lower refined solution interval or in said upper refined solution interval.

3. An apparatus for analyzing speech signals as recited in claim 2 wherein said half distance generating unit and said angle bisecting unit cooperate to successively perform said bisecting operation to iteratively bisect each solution interval into a successive upper refined solution interval and a successive lower refined solution interval, said respective root being located within one of said successive upper refined solution interval and said successive lower refined solution interval, said successive bisecting operation being iteratively effected until a predetermined desired accuracy of said arc-length is included in a successive refined solution interval.

4. An apparatus for analyzing speech signals as recited in claim 1 wherein said initial value is expressed as a sinusoidal value of an angular displacement on said unit circle and wherein said step value is expressed as a sinusoidal value of a step-angular displacement on said unit circle.

5. An apparatus for analyzing speech signals as recited in claim 2 wherein said initial value is expressed as a sinusoidal value of an angular displacement on said unit circle and wherein said step value is expressed as a sinusoidal value of a step-angular displacement on said unit circle.

6. A method for analyzing speech signals to determine parameters expressive of characteristics of the speech signals, comprising steps of:

converting speech signals to linear predictive coding (LPC) parameters;

transforming said LPC parameters to a corresponding line spectrum pair (LSP) expression; and locating a plurality of roots of said LSP expression, said roots being the parameters expressive of the speech characteristics, including steps of:

receiving a representation of an initial value for locating a first site on a unit circle;

receiving a representation of a step value for defining an arc-distance on said unit circle;

generating a plurality of intervals on said unit circle, each interval of said plurality of intervals having a lower limit and an upper limit, said plurality of intervals including an initial interval and a plurality of succeeding intervals; said lower limit of said initial interval being said initial value, said upper limit of said initial interval being displaced on said unit circle from said initial value by said arc-distance; each respective succeeding interval of said plurality of succeeding intervals having its respective lower limit coincident with said upper limit of the next-preceding interval of said plurality of intervals, each said respective succeeding interval having its respective upper limit displaced on said unit circle from its respective lower limit by said arc-distance;

evaluating said line spectrum pair expression for at least said upper limit and said lower limit of each said respective interval of said plurality of intervals;

recognizing presence of a respective root of said plurality of roots when said line spectrum pair expression changes sign within a particular interval of said plurality of intervals;

designating each said particular interval as a solution interval; and generating said lower limit and said upper limit of each said solution interval, wherein the plurality of roots present in said solution intervals express the characteristics of the speech signals.

7. A method for analyzing speech signals as recited in claim 6 wherein the method comprises the further steps of:

generating a half-arc-distance, said half-arc-distance being one-half said arc-distance;

performing a bisecting operation defining a lower refined solution interval and an upper refined solution interval, said lower refined solution interval having a lower refined lower limit at said lower limit of said solution interval and having a lower refined upper limit displaced on said unit circle from said lower refined lower limit said half-arc-distance; said upper refined solution interval having an upper refined upper limit at said upper limit of said solution interval and having an upper refined lower limit displaced on said unit circle from said upper refined upper limit said half-arc-distance; and generating a lower limit output and an upper limit output appropriately to indicate whether said respective root is located in said lower refined solution interval or in said upper refined solution interval.

8. A method for analyzing speech signals as recited in claim 7 wherein the method comprises the further steps of:

successively performing said bisecting operation to iteratively bisect each solution interval into a successive upper refined solution interval and a successive lower refined solution interval, said respective root being located within one of said successive upper refined solution interval and said successive lower refined solution interval, said successive bisecting operation being iteratively effected until a predetermined desired accuracy of said arc-length is included in a successive refined solution interval.

9. A method for analyzing speech signals as recited in claim 6 wherein said initial value is expressed as a sinusoidal value of an angular displacement on said unit circle and wherein said step value is expressed as a sinusoidal value of a step-angular displacement on said unit circle.

10. A method for analyzing speech signals as recited in claim 7 wherein said initial value is expressed as a sinusoidal value of an angular displacement on said unit circle and wherein said step value is expressed as a sinusoidal value of a step-angular displacement on said unit circle.

11. A computer apparatus for analyzing speech signals to determine parameters expressive of characteristics of the speech signals, comprising:

a linear predictive coding (LPC) analysis means for converting speech signals to LPC parameters;

a transforming means for transforming said LPC parameters to a corresponding line spectrum pair (LSP) expression;

a waveform generating means for generating a lower limit value and an upper limit value for each respective interval of a plurality of intervals on said unit circle; said plurality of intervals being adjacent, each said respective interval subtending a predetermined arc-distance;

a root detecting means coupled with said waveform generating means for detecting means receiving said lower limit root detecting means receiving said lower limit value and said upper limit values and determining an evaluation value for said line spectrum pair expression for at least said lower limit value and said upper limit value for each said respective interval; said root detecting means designating a particular said respective interval solution interval when said evaluation value changes sign within said particular respective interval; said root detecting means generating said lower limit value and said upper limit value of each said solution interval; wherein the plurality of roots present in said solution intervals express the characteristics of the speech signals.

12. An apparatus for analyzing speech signals as recited in claim 11 wherein the apparatus further comprises:

- a half distance generating means coupled with said waveform generating means for generating a half-arc-distance, said half-arc-distance being one-half said arc-distance;
- an angle bisecting means coupled with said half distance generating means and coupled with said root detecting means for receiving said solution interval and said half-arc-distance and performing a bisecting operation defining a lower refined solution interval and an upper refined solution interval, said lower refined solution interval having a lower refined lower limit at said lower limit of said solution interval and having a lower refined upper limit displaced on said unit circle from said lower refined lower limit said half-arc-distance; said upper refined solution interval having an upper refined upper limit at said upper limit of said solution interval and having an upper refined lower limit displaced on said unit circle from said upper refined upper limit said half-arc-distance; and
- a selection means coupled with said angle bisecting means and with said root detecting means for generating a lower limit output and an upper limit output appropriately to indicate whether said respective root is located in said lower refined solution interval or in said upper refined solution interval.

13. An apparatus for analyzing speech signals as recited in claim 12 wherein said half distance generating means and said angle bisecting means cooperate to successively perform said bisecting operation to iteratively bisect each solution interval into a successive upper refined solution interval and a successive lower refined solution interval, said respective root being located within one of said successive upper refined solution interval and said successive lower refined solution interval, said successive bisecting operation being iteratively effected until a predetermined desired accuracy of said arc-length is included in a successive refined solution interval.

14. An apparatus for analyzing speech signals to determine parameters expressive of characteristics of the speech signals, comprising:

- a linear predictive coding (LPC) analysis unit configured to convert speech signals to LPC parameters;
- a transformation unit configured to transform said LPC parameters to a corresponding line spectrum pair (LSP) expression;
- a digital waveform generating unit including a first waveform input for receiving an initial value for locating a waveform site on the unit circle, a second waveform input for receiving a representation of a step value for defining an arc-distance on the unit circle, and a waveform output for providing a plurality of intervals, the waveform generating unit generating the plurality of intervals on the unit circle, each interval of the plurality of intervals having a lower limit and an upper limit, wherein a difference between the upper limit and the lower limit is the step value; and
- a digital polynomial zero detecting unit including a line spectrum pair polynomial unit, a delay unit, a sign change detecting unit, and a buffer, the line spectrum pair polynomial unit having a unit input coupled to the waveform output of the waveform generating unit and a unit output, the polynomial unit providing a polynomial output signal at the unit output, the delay unit having a delay input coupled to the unit output and a delay output, the delay unit providing a delayed output signal at the delay output, the sign change detecting unit having a first detecting input coupled to the unit output, a second detecting input coupled to the delay output, a detecting output coupled to the buffer, wherein the buffer unit stores an interval of said intervals provided at the waveform output when the sign change detecting unit determines a sign change between the polynomial output signal received at the first detecting input and the delay output signal, the second detecting output, wherein the interval stored in the buffer represents one of the plurality of roots of the line spectrum pair expression; wherein the plurality of roots present in said intervals express the characteristics of the speech signals.

15. An apparatus for analyzing speech signals as recited in claim 14 further comprising:

- a digital half distance generating unit coupled to the digitla waveform generating unit for reducing the difference of the upper and lower limits provided by the digital waveform generating unit.

16. An apparatus for analyzing speech signals as recited in claim 14 wherein the upper limit and lower limit are represented as a sinusoidal value.

17. An apparatus for analyzing speech signals as recited in claim 14 wherein the digital waveform generating unit includes a random access memory.

18. An apparatus for analyzing speech signals as recited in claim 14 wherein the waveform generating unit includes a plurality of adders and delay units.

19. An apparatus for analyzing speech signals as recited in claim 14 wherein the waveform generating unit further includes a function generator which generates a value of $-1\cos$ of a selected angle.

20. An apparatus for analyzing speech signals as recited in claim 14 wherein the waveform generating unit further includes a zero detect unit.

* * * * *

UNITED STATES PATENT AND TRADEMARK OFFICE
CERTIFICATE OF CORRECTION

PATENT NO. : 5,745,648
DATED : 4/28/1998
INVENTOR(S) : Asghar et al.

It is certified that error appears in the above-identified patent and that said Letters Patent is hereby corrected as shown below:

At column 26, lines 28-29, the phrase "signal, the second detecting output" should be replaced with --signal at the second detecting input--.

At column 26, line 52, the phrase "-1cos" should be replaced with --1-cos--.

Signed and Sealed this

Twenty-seventh Day of March, 2001

Attest:

NICHOLAS P. GODICI

Attesting Officer

Acting Director of the United States Patent and Trademark Office